United States Patent [19]
Ziemer et al.

[11] Patent Number: 6,122,310
[45] Date of Patent: *Sep. 19, 2000

[54] METHOD AND APPARATUS FOR FACILITATING MULTI-RATE DATA TRANSMISSION BY SELECTING A PLURALITY OF SPREADING CODES

[75] Inventors: Rodger E. Ziemer, Colorado Springs, Colo.; Roger L. Peterson, Inverness, Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 09/015,091

[22] Filed: Jan. 29, 1998

[51] Int. Cl.$^7$ ................................... H04B 1/707
[52] U.S. Cl. ........................ 375/142; 375/146; 375/150
[58] Field of Search .................... 375/200, 206, 375/142, 145, 146, 149, 150; 370/335, 342, 441

[56] References Cited

U.S. PATENT DOCUMENTS

| | | | |
|---|---|---|---|
| 5,515,396 | 5/1996 | Dalekotzin | 375/206 |
| 5,583,884 | 12/1996 | Maruyama et al. | 375/207 |
| 5,625,639 | 4/1997 | Tomita et al. | 375/200 |
| 5,748,668 | 5/1998 | Tomita et al. | 375/200 |

*Primary Examiner*—Don N. Vo
*Attorney, Agent, or Firm*—Kenneth A. Haas

[57] ABSTRACT

A communication system facilitates multi-rate data transmission by using a set (N) (210) of spreading codes from which a subset (n) (214) of the spreading codes is dynamically selected based on a first set of bits from source digital information to be transmitted. The subset (214) of spreading codes are simultaneously transmitted and used for coding a second set of bits from the source digital information. A receiver has correlators (306–309) to correlate each of the set of spreading codes with a received spread spectrum signal (302) to produce correlated signals. A code subset estimation circuit (312) is coupled to each correlator (306–309) and determines the magnitude of each of the correlated signals. The code subset estimation circuit (312) selects a subset of spreading codes from the set of spreading codes based on the magnitude of all correlated signals and determines the polarity of the subset of codes to decode the encoded received data.

23 Claims, 2 Drawing Sheets

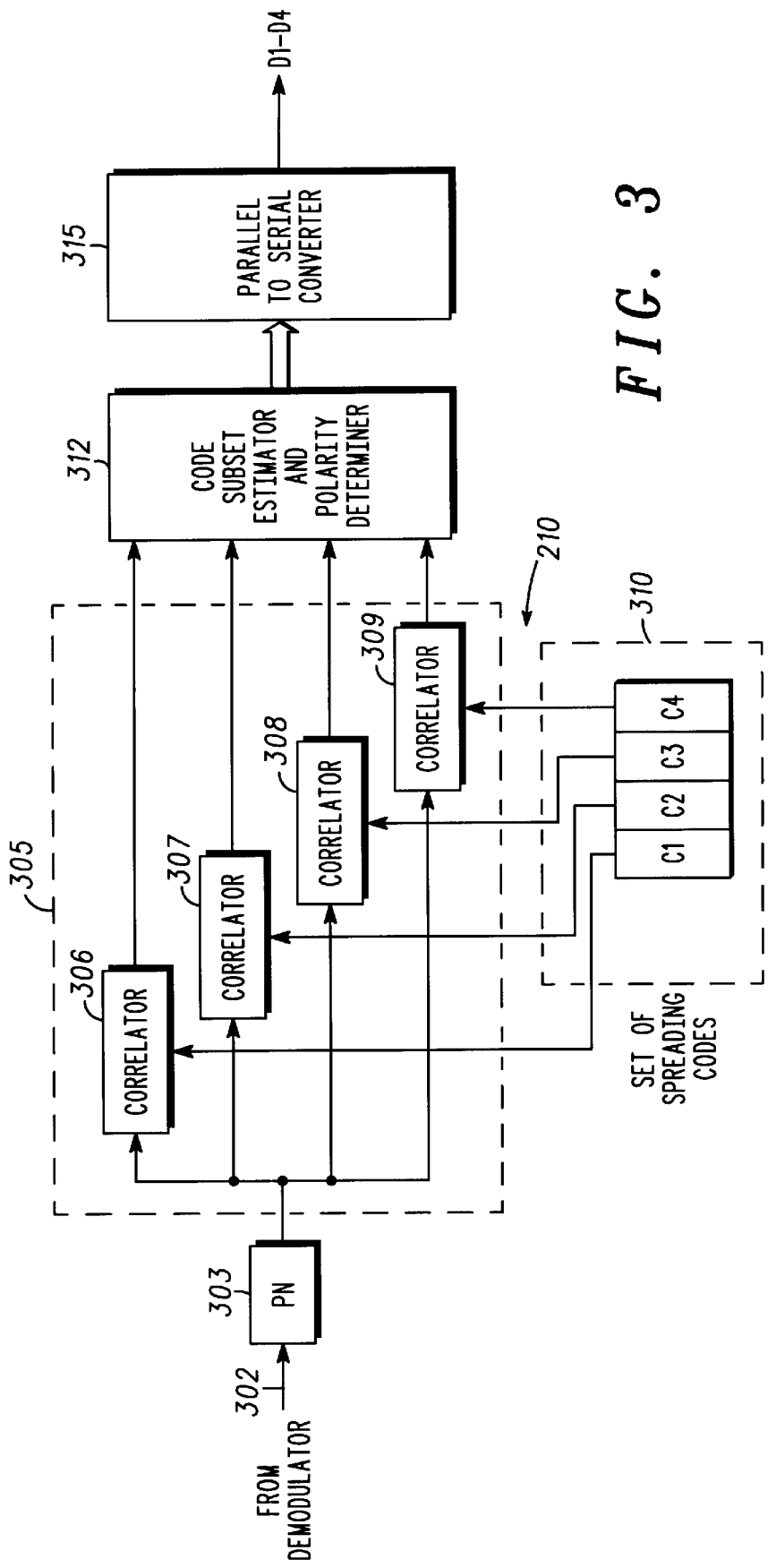

METHOD AND APPARATUS FOR FACILITATING MULTI-RATE DATA TRANSMISSION BY SELECTING A PLURALITY OF SPREADING CODES

FIELD OF THE INVENTION

The invention relates generally to communication systems, and more particularly to utilizing multiple spreading codes in such communication systems.

BACKGROUND OF THE INVENTION

Communication systems take many forms. In general, the purpose of a communication system is to transmit information-bearing signals from a source, located at one point, to a user destination, located at another point some distance away. A communication system generally consists of three basic components: transmitter, channel, and receiver. The transmitter has the function of processing the message signal into a form suitable for transmission over the channel. This processing of the message signal is referred to as modulation. The function of the channel is to provide a physical connection between the transmitter output and the receiver input. The function of the receiver is to process the received signal so as to produce an estimate of the original message signal. This processing of the received signal is referred to as demodulation.

Analog and digital transmission methods are used to transmit a message signal over a communication channel. The use of digital methods offers several operational advantages over analog methods, including but not limited to: increased immunity to channel noise and interference, flexible operation of the system, common format for the transmission of different kinds of message signals, improved security of communication through the use of encryption and increased capacity.

To transmit a message signal (either analog or digital) over a communication channel having an assigned channel bandwidth, the message signal must be manipulated into a form suitable for efficient transmission over the channel. Modification of the message signal is achieved by means of a process termed modulation. This process involves varying some parameter of a carrier wave in accordance with the message signal in such a way that the spectrum of the modulated wave matches the assigned channel bandwidth. Parameters of a carrier wave that can be varied include amplitude, frequency, and or phase. Correspondingly, the receiver is required to re-create the original message signal from a degraded version of the transmitted signal after propagation through the channel. The re-creation is accomplished by using a process known as demodulation, which is the inverse of the modulation process used in the transmitter.

A spread spectrum system provides, among other things, robustness to jamming, good interference and multipath rejection, and inherently secure communications from eavesdroppers. In a spread spectrum system, a modulation technique is utilized in which a transmitted signal is spread over a wide frequency band within the communication channel. The frequency band is much wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth of the information itself. However, in a spread spectrum system, the modulation of a signal to be transmitted often includes taking a baseband signal (e.g., a voice channel) with a bandwidth of only a few kilohertz, and distributing the signal to be transmitted over a frequency band that may be many megahertz wide. This is accomplished by modulating the signal to be transmitted with the information to be sent and with a wideband encoding signal (commonly known as a spreading code).

Thus, a spread spectrum system must have two properties: In (1) the transmitted bandwidth should be much greater than the bandwidth or rate of the information being sent and (2) some function other than the information being sent is employed to determine the resulting modulated channel bandwidth.

The essence of the spread spectrum communication involves expanding the bandwidth of a signal, transmitting the expanded signal and recovering the desired signal by remapping the received spread spectrum into the original information bandwidth. Furthermore, in the process of carrying out this series of bandwidth trades, the purpose of spread spectrum techniques is to allow the system to deliver reliable information in a noisy signal environment.

With digital communication, user information such as speech is encoded into sequences of binary information symbols. This encoding is convenient for modulation and is easily error-correction coded for transmission over a potentially degrading communication channel. Such binary information is particularly amenable to transmission using "direct sequence" spread spectrum modulation. With direct sequence, digital information is spread with a spreading code whose bit rate is much higher than the information signal itself. Although the spreading can be accomplished by several methods, the most common is to modulo-2 add each bit of information (generally after appropriate error correction coding) to a sequence of bits of the spreading code. Thus as desired for the spreading process, many bits are generated for each coded information bit that is desired to be transmitted.

Advantages from direct sequence spread spectrum communication systems are obtained since the receiver is knowledgeable of the spreading code used to spread the user signal. As is well known in the art the receiver, after appropriate synchronization to the receive signal, is able to decode the wide bandwidth spread signal using a replica of the spreading sequence. Another advantage of spread spectrum communication systems is the ability to provide multiple access capability. Specifically, cellular telephone communication systems have been designed to incorporate the characteristic of communicating with many remote units on the same communication channel.

One type of multiple access spread spectrum communication system realized with direct sequence spread spectrum is a code division multiple access (CDMA) communication system. In a CDMA communication system, communication between two communication units is accomplished by spreading each transmitted signal over the frequency band of the communication channel with a unique user spreading code. As a result, transmitted signals are in the same frequency band of the communication channel and are distinguished only by being assigned unique user spreading codes. Particular transmitted signals are retrieved from the communication channel by despreading a signal which is the sum of signals in the communication channel with a user spreading code related to the particular transmitted signal which is to be retrieved from the communication channel. Specially suited spreading codes may be employed to reduce the interference created by the sum of all the other signals present on the same channel. Orthogonal codes are typically used for this purpose, and of these, the Walsh codes are most common.

One type of spread spectrum transmitter, such as that disclosed in the U.S. Pat. No. 5,515,396 assigned to instant assignee and hereby incorporated by reference, discloses a type of bi-orthogonal multi-rate transmitter that transmits only one spreading code at a time but selects from a plurality of orthogonal spreading codes to transmit data at a higher rate than conventional transmitters. With a fixed bandwidth spectrum however such a system can use up too many codes so that there are not enough spreading codes to be assigned to a multitude of users, such as where several users each use eight spreading codes. An exponentially increasing number of channels must be dedicated to provide for increasing multiples of a basic transmission rate. With a larger number of orthogonal waveforms, receiver complexity becomes restrictive. For example, the bi-orthogonal technique which makes a selection of a single spreading code to be used with a number of information bits equal to the rate multiplier minus one plus one bit to determine the sign or polarity of the selected code, uses up spreading codes exponentially as the rate multiplier increases. For example, for a basic rate of R, and a multiple rate of MR, $2^{M-1}$ codes are required (where M is the rate multiplier). Although such bi-orthogonal multi-rate coding schemes offer an advantage by having the peak to average power ratio (in decibels) effectively zero since only one code is transmitted at a time, the increase in traffic demands for many communication systems requires a system that can offer a more efficient use of a limited number of spreading codes.

Another type of spread spectrum multi-rate coding technique, sometimes referred to as the "sum of codes technique", allows for generation of two times a standard rate by simultaneously transmitting the linear sum of two spreading codes which allows multi-rate transmission. This technique typically makes better use of spreading codes than the bi-orthogonal technique. However higher and more variable power amplifier peak to average levels are required thereby increasing the cost and complexity of both the transmitter and associated receiver. Generally, the sum of codes technique increments the rate by adding a new spreading code for each integer multiple of a given rate. A disadvantage of this approach is that the peak to average power ratio of a transmitted signal worsens with each code added.

Consequently there exists a need for a multi-rate communication system for a spread spectrum communication system that substantially overcomes the above drawbacks while maintaining or improving performance comparable with such alternative approaches.

BRIEF DESCRIPTION OF THE DRAWINGS

FIG. 3 is a block diagram of one embodiment of a spread spectrum receiver in accordance with the invention.

DETAILED DESCRIPTION OF THE PREFERRED EMBODIMENT

A communication system facilitates multi-rate data transmission by using a set (N) of spreading codes from which a subset (n) of the spreading codes is dynamically selected based on a first set of bits from source digital information to be transmitted. The subset of spreading codes are simultaneously transmitted and used for coding a second set of bits from the source digital information. In contrast to traditional sum of code modulation techniques, a subset of codes is dynamically selected for simultaneous transmission such that a subset of codes such as 2 or 3 codes of a larger set of spreading codes are used at any one time. Accordingly, the disclosed system permits multiple rate transmission of data in a multiple access spread spectrum communication system in integer increments of a basic rate R while keeping a peak to average power ratio (PAV) of a transmitted signal at a predetermined suitable level. Other unselected code combinations from the set may be used in transmitting synchronization and control information. Where the subset of spreading codes is 2 or 3 codes, a linear relationship is maintained between the number of codes used and the rate multiplier, which contrasts significantly from bi-orthogonal modulation techniques where the number of codes increases exponentially as a function of the rate multiplier.

A receiver uses a reduced number of correlators over the number required for traditional bi-orthogonal modulation communication system as a result of the smaller number of codes used. Bit error probability may improve with increasing rate multipliers so that for large multiples of a basic rate (R), approximately 5 times the basic rate or greater, the bit error probability of the disclosed system is improved over that of the conventional sum of codes modulation technique.

Figure 1A:
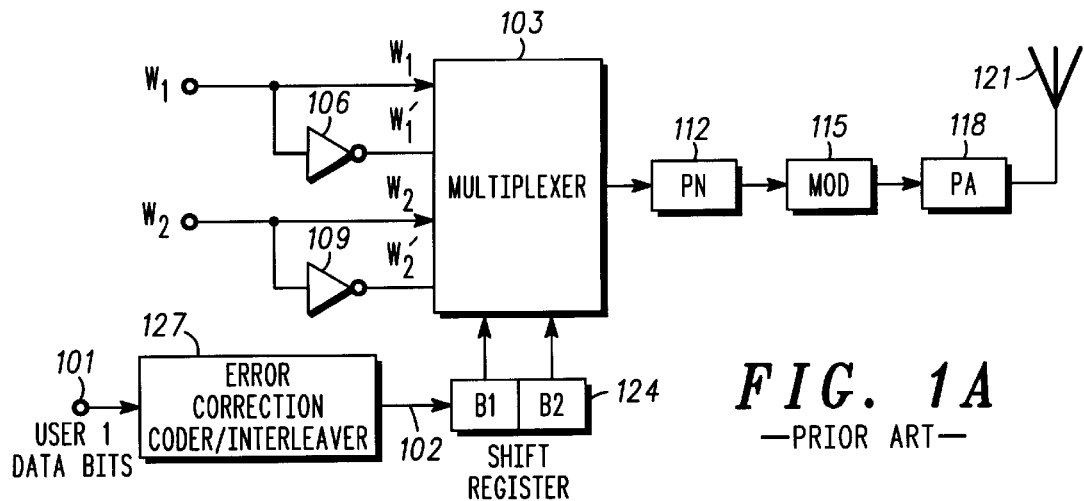
FIG. 1A is block diagram generally depicting a prior art spread spectrum transmitter.

FIG. 1A shows a prior art bi-orthogonal type spread spectrum transmitter that transmits user data at twice the rate of a conventional transmitter. The characteristics of the signal ultimately transmitted in terms of chip rate, amplitude, spectrum etc. is identical to prior art techniques. Continuing, user 1 data bits 101 enter error correction coder/interleaver 127 which provides coding and interleaving as in prior art transmitters. The user 1 data bits 101 are at twice the rate of a basic rate R. The resulting bits 102 exiting error correction coder/interleaver 127, therefore, are at twice the rate as bits transmitted at a basic rate R. The bits 102 exiting error correction coder/interleaver 127 are blocked into a two bit word by shift register 124, and the bits are marked B1 and B2. The state of these two bits will determine a particular Walsh code and phase transmitted through the use of multiplexer 103. In this double rate example, to transmit twice the data rate requires the use of a second Walsh code, $W_2$ in addition to the first Walsh code, $W_1$.

A four to one multiplexer 103 has as input a first Walsh code, $W_1$, its phase reversal, $W_1'$, a second Walsh code, $W_2$ and its phase reversal $W_2'$. The particular Walsh code information transmitted is selected by the contents B1, B2 of the shift register 124. For each two bits captured by shift register 124, a single 64-bit Walsh code/phase selection is made. This scheme does not require an increase in the spreading code chip rate.

TABLE 1 depicts how a particular Walsh code is selected. B1 and B2 can each take on either a zero or one.

TABLE 1

|  | B1 | B2 |
|---|---|---|
| $W_1'$ | 0 | 0 |
| $W_1$ | 0 | 1 |
| $W_2$ | 1 | 0 |
| $W_2'$ | 1 | 1 |

Therefore there are four possible states for B1 and B2. The chart shows how these states would be used to select one of the Walsh code/phases $W_1$, $W_1'$, $W_2$ and $W_2'$, The transmitter 100 allows for the utilization of multiple spreading codes (Walsh codes) to transmit at a higher (e.g., 2X) information rate without a substantial duplication of transmitter hardware. One of a multiple of Walsh codes is utilized to accommodate a higher information rate while a single transmitter chain is maintained. However, as data rate is increased and additional codes are needed, an exponential increase in required codes is needed since only one code is transmitted at a time. Moreover, a corresponding receiver for use in such a prior art system would require a large number of correlators namely a correlator for each exponentially added code as additional users are added to the system.

Figure 1B:
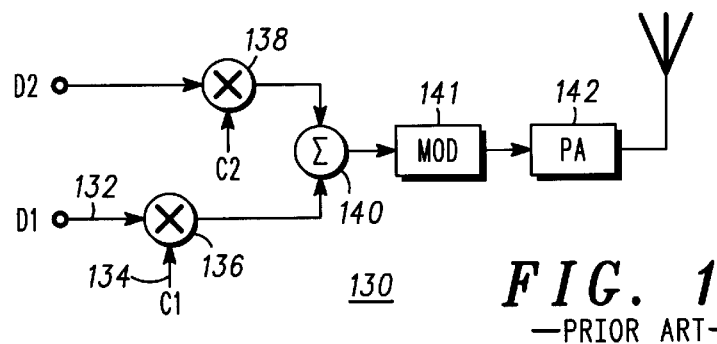
FIG. 1B is block diagram generally depicting another type of prior art spread spectrum transmitter.

FIG. 1B shows one example of a prior art sum of codes (multi-code) transmitter 130. User data 132 is spread with a first spreading code 134 and used to determine a polarity of the encoded signal through multiplier 136. As additional rates are needed, additional spreading codes are added. Therefore for a two times rate transmitter, two spreading codes C1 and C2 are used to spread two data streams for one user. For a three times rate transmitter, three codes are used and so on. A corresponding multiplier 138 is used for each code. A summer 140 combines the encoded signals which passed to modulator 141, are modulated and transmitted simultaneously as a linear summed multi-code signal from power amplifier 142.

Figure 2:
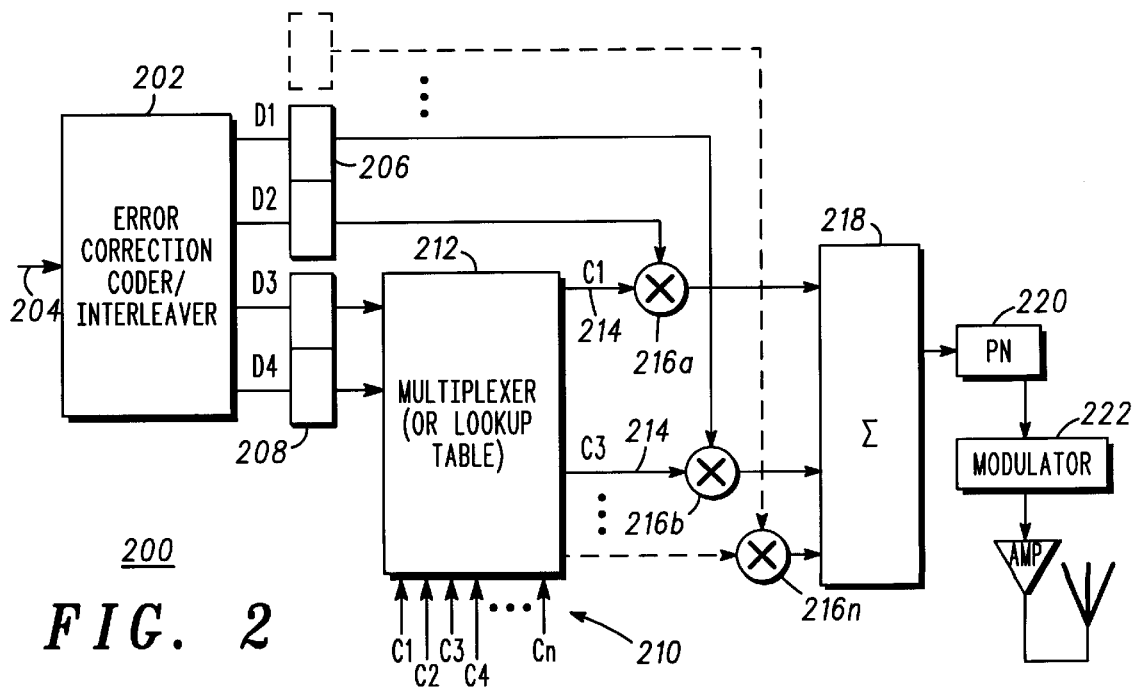
FIG. 2 is a block diagram of a multi-rate data transmitter in accordance with one embodiment of the invention.

FIG. 2 shows a block diagram a multi-rate data transmitter 200 in accordance with one embodiment of the invention. An error correction coder/interleaver 202 encodes source digital information 204 as known in the art. The error correction coder/interleaver 202 outputs a first set of bits D3 and D4 to a shift register 208. In this example, a first set of bits D1 and D2 are also passed to shift register 206. The set of bits D1 and D2 are selected by shift register 206 or may be routed to a shift register or other memory device by a separate processing unit. It will be recognized by those of ordinary skill in the art that the shift registers 206 and 208 may be the same shift register or any other suitable storage element.

A set 210 of spreading codes C1, C2, C3 and C4 are stored in the transmitter 200 or dynamically communicated to the transmitter 200 via an RF communication. The set 210 of spreading codes C1–C4 are preferably orthogonal to each other and are Walsh codes, although other codes may also be used. A selector 212, such as a four to two multiplexer, selects a subset 214 of two spreading codes, such as C1 and C3, from the complete set 210 of spreading codes for use in spreading (coding) the set of bits D1and D2. The set of spreading codes may be any suitable number ($C_n$) to facilitate a desired rate.

The subset 214 of spreading codes C1 and C3 serve as input to multipliers 216a and 216b. The multiplier 216a and 216b receive as input data bits D1 and D2 respectively as shown. A combiner 218 combines the output of multipliers 216a and 216b to form a combined multi spreading code output signal which is transmitted to a receiver. A PN spreader 220 provides scrambling of Walsh coded data as known in the art. The encoded source digital information from combiner 218 after being scrambled by PN spreader 220, is modulated as known in the art by modulator 222, amplified by power amplifier 224 and radiated out antenna 226 to complete transmission of the source digital information 204.

The combiner 218 combines transmission of the subset of the spreading codes 214 to allow simultaneous transmission of multiple spreading codes to facilitate multi-rate data transmission. The encoded output signal from combiner 218 is encoded source digital information in the form of the subset of at least two spreading codes that have polarity information determined as the function of the second set of bits D1 and D2. The first set of bits D3 and D4 represent subset spreading code selection bits since they are used to dynamically select a subset 214 of spreading codes from the set of spreading codes 210. The content of the shift register determines which codes are selected from the set of codes. As different data is shifted, different combinations of code subsets are used. The second set of bits represent polarity selection data since their values are used to determine a polarity of coded information to be transmitted. The shift registers 206 and 208 capture a block of encoded data bits from encoder 202. The second set of data bits D1 and D2 are spread (coded) through multiplier 216a and 216b as a function of the spreading codes 214. As shown, the subset of simultaneously transmitted spreading codes are modulated prior to transmission. The modulator 222 performs phase modulation on the linear combined encoded signals as known in the art. Using the subset of codes, the power amplifier 224 (and corresponding receiver) has a lower peak to average power swing than that of a conventional sum of codes type transmitter for the same rate since fewer codes are linearly combined (see for example Table 3) to obtain a same communication rate.

TABLE 2 below shows an example of selection of a subset of spreading codes based on the first set of data bits D3 and D4.

TABLE 2

| Subset of N Codes | D3 | D4 . . . Dn |
|---|---|---|
| C1 and C2 | 0 | 0 |
| C1 and C3 | 0 | 1 |
| C1 and C4 | 1 | 0 |
| C2 and C3 | 1 | 1 |
| . | | |
| . | | |
| . | | |
| Ci and Cj | | |

For example, if one of the spreading codes by itself can be used to transmit at a basic rate R, integer multiples of this basic rate are obtained by selecting n codes from N codes available. This code selection requires $$K = \left\lfloor \log_2 \binom{N}{n} \right\rfloor$$

bits to specify, where $\lfloor \ \rfloor$ denotes the largest integer not exceeding the quantity with the brackets. The linear combination of the n selected codes is sent, where n additional bits are used to determine the sign of each code in the linear combination, for a total of M=K+n bits or a rate of MR.

FIG. 3 depicts one embodiment of a spread spectrum receiver in accordance with the invention. The receiver 300 receives the encoded signal transmitted by transmitter 200 of FIG. 2. The received encoded (spread spectrum) signal is a stream of transmitted bits encoded based on the simultaneously transmitted subset of spreading codes from the set of spreading codes. Receiver 300 performs the normal PN correlation of information received from a receiver demodulator (not shown) in PN block 303. Output from PN block 303 is split to feed a correlator circuit 305 which simultaneously correlates the received encoded signal with all of the codes in the set 210 of codes to facilitate determination of the subset 214 of codes used by the transmitter to encode the original data. The correlator circuit 305 includes standard Walsh correlators 306–309. There is a corresponding Walsh correlator for each spreading code in the set 210 of spreading codes. A single correlator for each Walsh code is used since the transmitter 200 in FIG. 2 is utilizing a simultaneous subset of Walsh codes to send information of a single user and it is required that the receiver accommodate differing combinations of subsets, by detecting which subset of codes were used to encode the original data. Although shown as a series of independent correlators, the correlator circuit 305 may be one correlator that receives all of the codes in the set 210 of codes, or other suitable combination if desired.

After Walsh decorrelation by correlators 306–309, the outputs of each correlator are examined by a code subset estimation circuit 312. The code subset estimation circuit 312 decides, through examining the analog (or digital) bi-polar outputs of Walsh correlators 306–309, a subset n having the largest energy (absolute value) to select which subset of codes were used by the transmitter 200 to encode the original data. The receiver 300 obtains, a priori, data from an RF communication or as preprogrammed data, the number codes (e.g., two, three . . . ) in the subset of codes It is understood that synchronization techniques, well known in the art, may be necessary to properly input the aforementioned technique. In particular, receiver 300 must be knowledgeable of how the first and second set of bits are blocked by the shift registers for selection of a particular Walsh code subset and phase. In other words, the receiver must know the information in TABLE 2.

A comparison of the number of codes required for various rates using conventional prior art, sum of codes, and bi-orthogonal systems is shown below in Table 3 along with an estimated peak to average power ratio based on modeling. The superscript "a" in the "Sel n of N codes" columns represent that two of N codes are selected from the set of codes and the superscript "b" in the "Sel n of N codes" columns represent that three of N codes are selected from the set of codes. For example, for a rate of 5R, if five codes are in the set (N) then two of the five codes are used as the subset of codes. If four codes are in the set (N), then three codes are used as the subset of codes.

TABLE 3

| RATE | Total Number of Codes Req'd | | | Peak-to-Average Power Ratio (dB) | | |
|---|---|---|---|---|---|---|
| | Sum of Codes | Biorthog. | Sel n of N Codes (N) | Sum of Codes | Biorthog. | Sel n of N Codes (N) |
| R | 1 | 1 | 1 | 0 | 0 | 0 |
| 2R | 2 | 2 | $2^a$ | 3 | 0 | $3^a$ |
| 3R | 3 | 4 | $3^a$ | 4.8 | 0 | $3^a$ |
| 4R | 4 | 8 | $4^a$ | 6 | 0 | $3^a$ |
| 5R | 5 | 16 | $5^a$ or $4^b$ | 7 | 0 | $3^a$ or $4.8^b$ |
| 6R | 6 | 32 | $7^a$ or $5^b$ | 7.8 | 0 | $3^a$ or $4.8^b$ |
| 7R | 7 | 64 | $9^a$ or $6^b$ | 8.5 | 0 | $3^a$ or $4.8^b$ |
| 8R | 8 | 128 | $12^a$ or $7^b$ | 9 | 0 | $3^a$ or $4.8^b$ | so that it knows how many of the codes from the correlators 306–309 need to be selected as the subset of codes. The code subset estimation circuit 312 also evaluates the polarity of the correlated signal then determines the phase of each signal. Determining the polarity of the subset of codes is used to decode the encoded received data as known in the art. This information is then passed to parallel to serial converter 315 for further processing.

Hence, each correlator 306–309 correlates one of each of the set of spreading codes with a received spread spectrum signal 302 to produce a correlated signal. The set of spreading codes is stored in memory 310 of the receiver. The received spread spectrum signal 302 as transmitted by the transmitter 200, includes a plurality of transmitted bits based on the simultaneously transmitted subset 214 of spreading codes from the set 210 of spreading codes. The code subset estimation circuit 312 is coupled to each correlator 306–309 and determines the magnitude and polarity of each of the resulting correlated signals from each correlator 306–309. In addition, the code subset estimation circuit 312 selects a subset of spreading codes from the set of spreading codes based on the magnitude of all correlated signals to determine which codes in the set of codes were used by the transmitter as the subset of spreading codes. The parallel to serial converter 315 identifies the plurality of transmitted bits based on the selected subset of spreading codes and their signs and outputs the decoded original source data bits. The correlators 306–309 and code subset determinator 312 are preferably implemented as a suitably programmed digital signal processor.

By segmenting the source digital information into two separate groups or blocks of bits and selecting a subset of spreading codes from a set of spreading codes for simultaneous transmission, the above described system can maintain a lower peak to average power ratio than a traditional sum of codes transceiver for high rate multiples since only a subset of spreading codes are simultaneously transmitted. Moreover, the disclosed system utilizes fewer spreading codes than traditional bi-orthogonal communication systems for comparable increases and data transmission rates.

It should be understood that the implementation of other variations and modifications of the invention in its various aspects will be apparent to those of ordinary skill in the art, and that the invention is not limited by the specific embodiments described. For example, the multiplexer may be replaced by a look-up table and processing unit that looks up a corresponding spreading code based on the value of the bit set D3 and D4. Also, the shift registers will be larger where more spreading codes are used in the set. It is therefore contemplated to cover by the present invention, any and all modifications, variations, or equivalents that fall within the spirit and scope of the basic underlying principles disclosed and claimedherein.

What is claimed is:

1. A method for facilitating multi-rate data transmission by selecting a plurality of spreading codes with which to spread source digital information in a spread spectrum transmitter, the method comprising the steps of:

selecting a first set of bits from the source digital information to be transmitted;

selecting, based on the first set of bits, a subset of at least two spreading codes from a set of spreading codes;

selecting a second set of bits from the source digital information to be transmitted;

modifying a polarity of a first spreading code from the at least two spreading codes based on a first bit from the second set of bits; and modifying a polarity of a second spreading code from the at least two spreading codes based on a second bit chosen from the second set of bits.

2. The method of claim 1 including the step of providing combined transmission of the subset of the at least two spreading codes.

3. The method of claim 1 wherein the set of spreading codes are orthogonal to each other.

4. The method of claim 1 wherein the first set of bits represent subset spreading code selection bits and the second set of bits represent polarity selection data.

5. The method of claim 1 wherein the set of spreading codes are Walsh codes.

6. A method for facilitating multi-rate data transmission by selecting a plurality of spreading codes with which to spread source digital information in a spread spectrum transmitter, the method comprising the steps of:

encoding a plurality of source data bits to be transmitted to produce a plurality of encoded data bits;

capturing a block of encoded data bits of the plurality of source data bits;

selecting, based on at least two encoded data bits from the block, a subset of at least two spreading codes from a set of spreading codes, for combined transmission; and employing a second plurality of source data bits to modify a polarity of the at least two spreading codes.

7. The method of claim 6 wherein the subset of at least two spreading codes are modulated prior to combined transmission.

8. The method of claim 7 wherein the modulation further comprises phase modulation.

9. The method of claim 6 wherein the set of spreading codes are orthogonal to each other.

10. The method of claim 6 wherein the set of spreading codes are Walsh codes.

11. A spread spectrum transmitter comprising:

means for selecting a first set of bits from a source of digital information to be transmitted; and means, coupled to the means for selecting the first set of bits, for selecting, based on the first set of bits, a subset of at least two spreading codes from a set of spreading codes;

means for selecting a second set of bits from the source digital information to be transmitted;

means for modifying a polarity of a first spreading code from the at least two spreading codes based on a first bit from the second set of bits; and means for modifying a polarity of a second spreading code from the at least two spreading codes based on a second bit chosen from the second set of bits.

12. The spread spectrum transmitter of claim 11 including means, coupled to the means for selecting the subset of at least two spreading codes, for providing combined transmission of the subset of the at least two spreading codes.

13. The spread spectrum transmitter of claim 11 wherein the set of spreading codes are orthogonal to each other.

14. The spread spectrum transmitter of claim 11 wherein the first set of bits represent subset spreading code selection bits and the second set of bits represent polarity selection data.

15. A spread spectrum transmitter comprising:

means for selecting a first set of bits from a source of digital information to be transmitted;

means, coupled to the means for selecting, for capturing a block of encoded data bits of the plurality of source data bits;

means, coupled to the means for capturing, for selecting based on at least two encoded data bits from the block, a subset of at least two spreading codes from a set of spreading codes, for combined transmission; and means, coupled to the means for selecting the subset of at least two spreading codes, for employing a second plurality of source data bits to modify a polarity of the at least two spreading codes.

16. The spread spectrum transmitter of claim 15 wherein the subset of at least two spreading codes are modulated prior to combined transmission.

17. The spread spectrum transmitter of claim 15 wherein the set of spreading codes are Walsh codes.

18. A spread spectrum transmitter comprising:

an encoder to encode a plurality of bits to be transmitted;

a first shift register, coupled to the encoder, to select at least two bits of the plurality of bits;

a second shift register that selects other of the encoded plurality of bits;

a multiplexer, coupled to the first shift register and to the plurality of multipliers, to output based on the at least two bits from the first shift register, a subset of at least two spreading codes from a set of spreading codes; and a plurality of multiplexers having as an input a spreading code from the at least two spreading codes and the other of the encoded plurality of bits, the plurality of multiplexers outputting the spreading code from the at least two spreading codes having a polarity based on the other of the encoded plurality of bits.

19. The spread spectrum transmitter of claim 18 further including a combiner, coupled to the plurality of multipliers, that combines the subset of at least two spreading codes for simultaneous transmission.

20. A spread spectrum receiver comprising:

means for correlating a received spread spectrum signal with all codes in a set of codes to produce a plurality of correlated signals, wherein the received spread spectrum signal includes a plurality of transmitted bits based on a simultaneously transmitted subset of spreading codes from the set of spreading codes;

means, coupled to the means for correlating, for determining a magnitude of the plurality of correlated signals and for selecting a subset of spreading codes from the set of spreading codes based on the magnitude determination to facilitate decoding of the received spread spectrum signal; and means, coupled to the means for correlating, for determining a polarity of each code of the subset of spreading codes to facilitate decoding of the plurality of transmitted bits.

21. The spread spectrum receiver of claim 20 including means, coupled to the means for correlating, for determining a polarity of each code of the subset of spreading codes to facilitate decoding of the plurality of transmitted bits.

22. A method for facilitating multi-rate data communication by selecting a plurality of spreading codes with which to identify a plurality of transmitted bits contained in a received spread spectrum signal, the method comprising the steps of:

correlating a first spreading code of a set of spreading codes with a received spread spectrum signal that includes a plurality of transmitted bits based on simultaneously transmitted subset of spreading codes from the set of spreading codes, to produce a first correlated signal;

correlating a second spreading code of a set of spreading codes with the received spread spectrum signal also based on the simultaneously transmitted subset of codes from the set of spreading codes to produce a second correlated signal; and determining a polarity of the first correlated signal and a polarity of the second correlated signal, for selecting a subset of spreading codes from a set of spreading codes based on the polarity for use in identifying data bits from the received spread spectrum signal.

23. The method of claim 22 wherein the first and second spreading codes are the subset of spreading codes and including correlating the received spread spectrum signal with all of the codes in the set of spreading codes as part of the steps of correlating the first and second spreading codes, to determine which codes in the set of codes were used by a transmitter as the subset of spreading codes.

* * * * *